June 3, 1958 D. V. TUTTLE ET AL 2,837,622
ACCELERATOR SWITCH CONTROL
Filed June 14, 1954 5 Sheets-Sheet 1
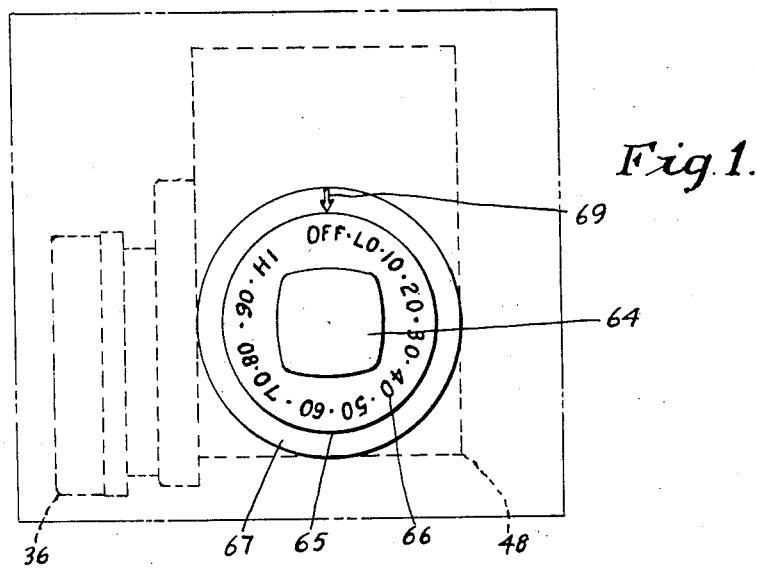
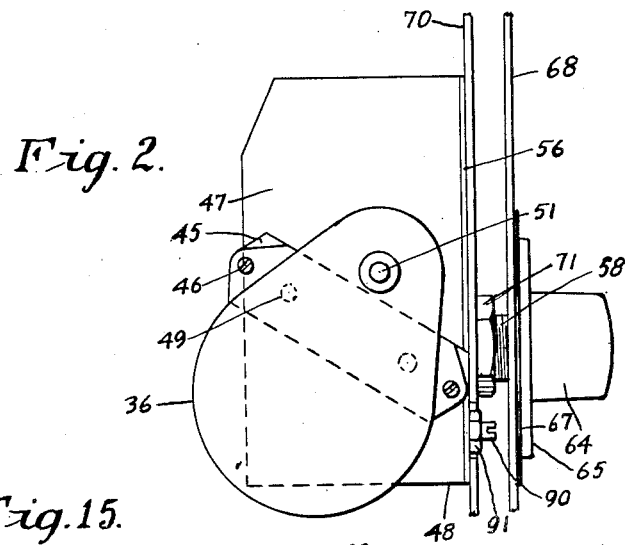
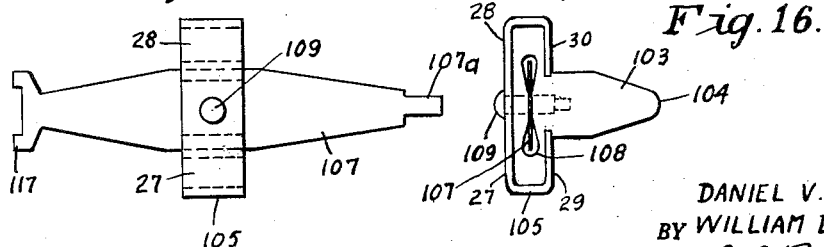
INVENTORS
DANIEL V. TUTTLE
BY WILLIAM D. KELLY
L. A. Paley
Att'y.

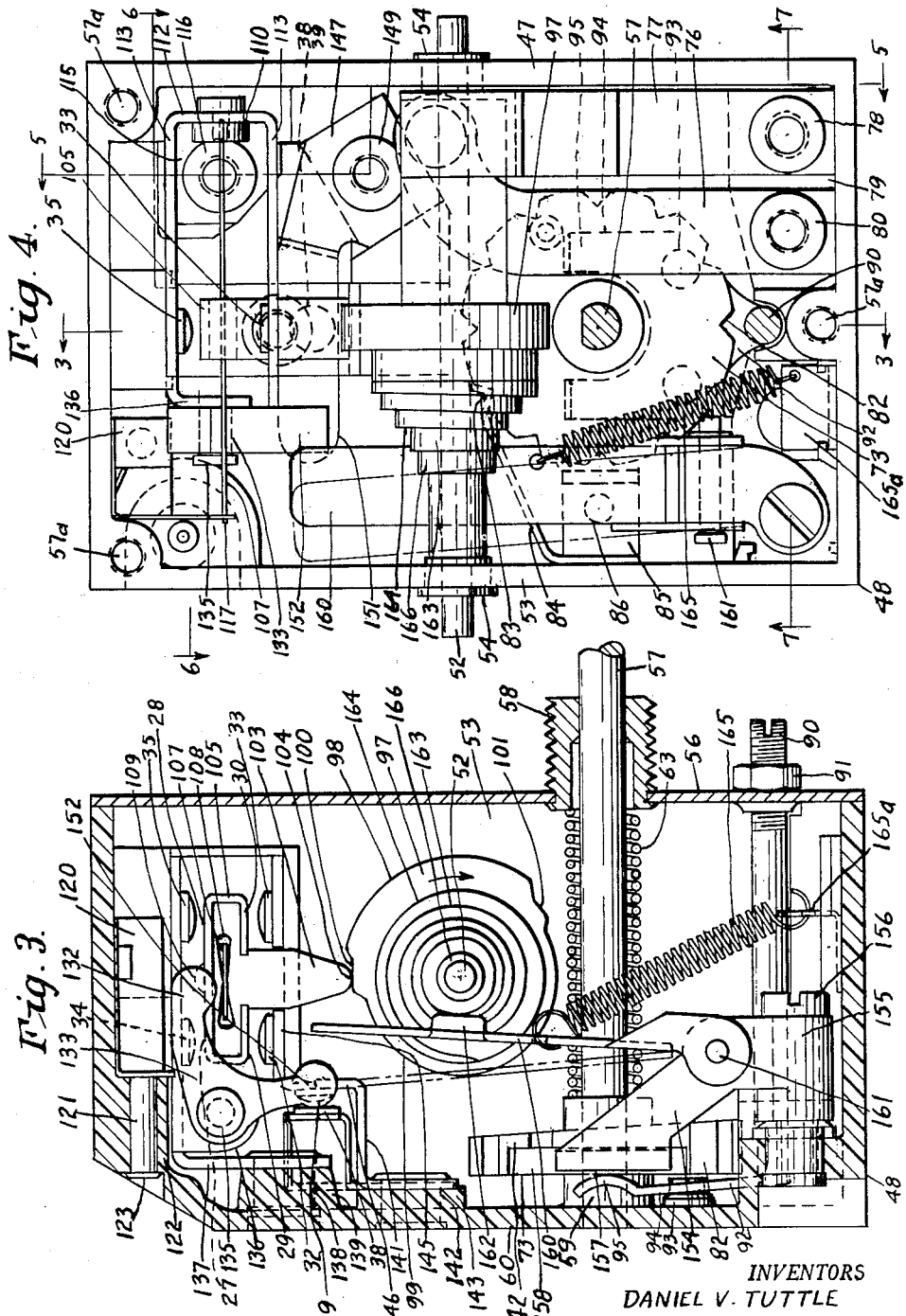

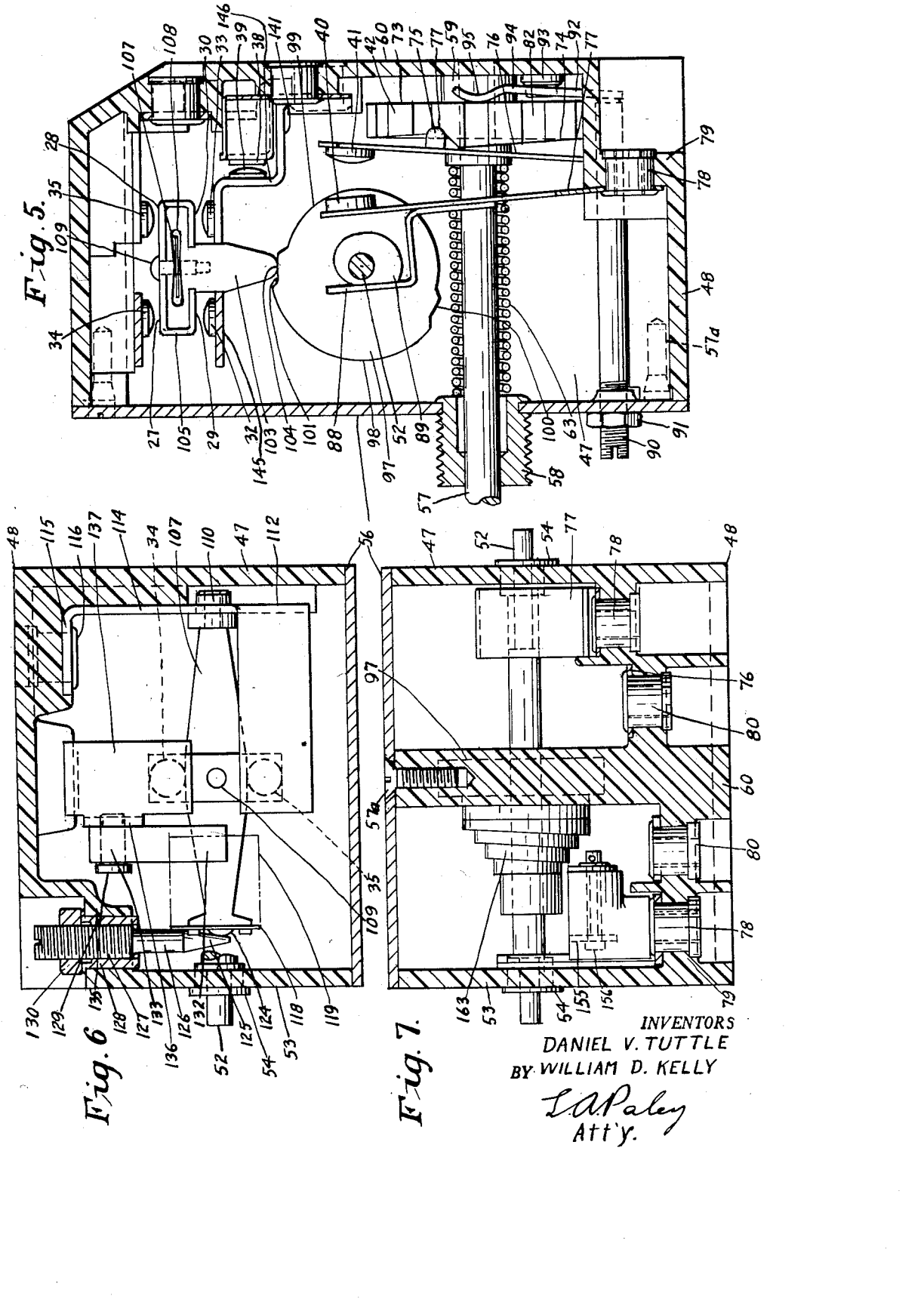

June 3, 1958 D. V. TUTTLE ET AL 2,837,622
ACCELERATOR SWITCH CONTROL
Filed June 14, 1954 5 Sheets-Sheet 4

INVENTORS
DANIEL V. TUTTLE
BY WILLIAM D. KELLY
L. A. Paley
Atty

June 3, 1958  D. V. TUTTLE ET AL  2,837,622
ACCELERATOR SWITCH CONTROL
Filed June 14, 1954  5 Sheets-Sheet 5
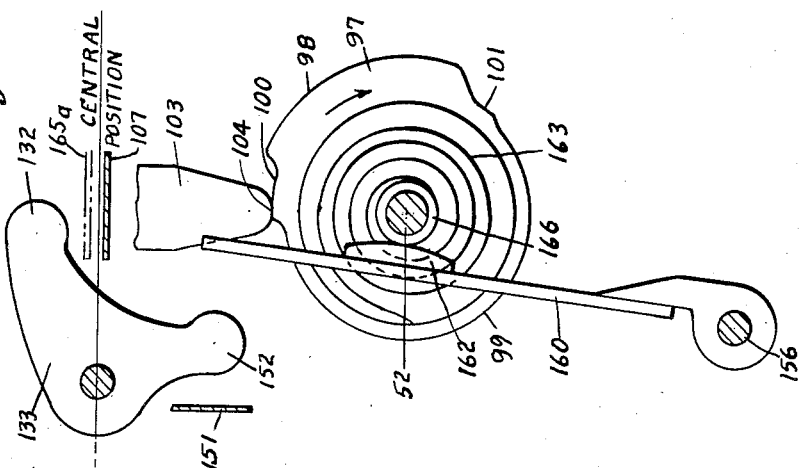
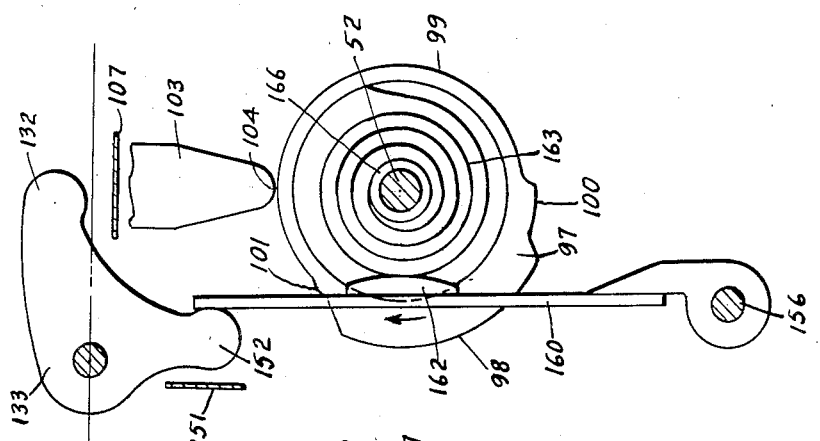
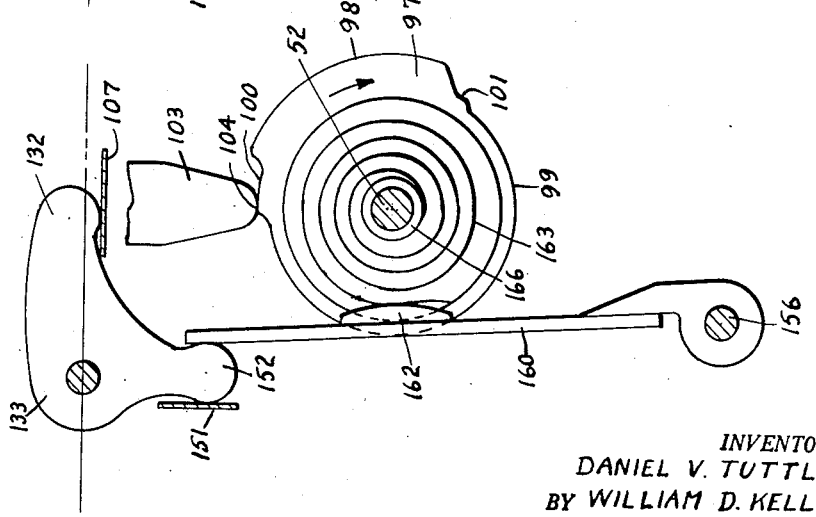
INVENTORS
DANIEL V. TUTTLE
BY WILLIAM D. KELLY
L. A. Paley
Att'y.

United States Patent Office 2,837,622
Patented June 3, 1958

2,837,622

ACCELERATOR SWITCH CONTROL

Daniel V. Tuttle, Kirkland, and William D. Kelly, Western Springs, Ill., assignors, by mesne assignments, to Ferro Corporation, Cleveland, Ohio, a corporation of Ohio Application June 14, 1954, Serial No. 436,470

10 Claims. (Cl. 219—20)

This invention relates to automatic controls for electric domestic cooking ranges, industrial ovens, heating elements, electrical pulse devices and electrical circuits.

The accelerator is unique and advantageous over any other accelerator that has been introduced on the market by reason of the fact that all other accelerators are operated with bi-metallic control, whereas our accelerator is a mechanical device, motor driven, assuring a definite cycle time, which protects the connected units from burning out as a result of overtiming which frequently happens with the bi-metallic type of accelerator due to the varying ambient temperatures. This device also operates as an infinite control permitting any degree of heat from approximately 3% to 100% of the connected load, and the device is designed so that when a switch knob is turned from "off" to any other position on the infinite control, it automatically flashes double or higher voltage into the connected unit for a limited time governed by the position of heat selected by the operator. This double voltage time will vary about 5 seconds to 30 seconds, for instance, and when the switch knob is turned from "off" to "high," a high voltage surge will remain in the units for the full 30 seconds. This maximum 30 seconds as allowed in this device can be varied simply by changing the angular position on the cam.

One manufacturer may want 50 seconds of high voltage surge in an application type or style of unit. This can be accomplished simply by changing the profile of the cam and upon the completion of the desired high voltage surge, the mechanism automatically throws the high voltage side out, and throws the low voltage or standard voltage side into the unit, and then the device continues to operate as an ordinary infinite control. Let us again emphaize that it is possible to alter the time cycle governing this operation simply by changing the profiles of the operating cams. A safety factor has been built into this device to protect the connected units from being resurged with high voltage. Once they have been in a heated condition, it is so designed that the high voltage surge cannot be repeated until the device has been completely turned in the "off" position for 3½ minutes. This time value can be varied by changing the profile of the spiral cam. When the device has been turned to the "off" position, the motor continues to operate for 3½ minutes at which time it shuts itself off automatically and then the unit is ready for a repeat surge of high voltage. If, however, the user decides to commence another cooking operation on the same unit, short of the 3½ minute time, she may do so, but she will only get standard heat or voltage. If by any chance, she would want the flash heat or high voltage surge, she would have to turn the unit off and wait for 3½ minutes, at which time, when the switch was turned from "off" to the "on" position, it would again flash the high voltage surge. This is not a timer device to control the overall cooking period, but rather a simple application of the infinite control in conjunction with the accelerator as described above, and operates to prevent the burning out of heating elements by high voltage.

An object of the invention, therefore, is to provide a control device for heating elements in which high voltage current is flashed into the heating element for a few seconds to quickly bring the heating element up to proper operating temperature.

Another object of the invention is to provide a preliminary flash heating at high voltage, followed by a cooking period in which a pulsating current is passed through the heating element to maintain a uniform temperature in the heat zone.

A further object of the invention is to provide a period of delay after the flash period before the control knob is effective to provide a flash heat so as not to burn out the heating element.

A still further object of the invention is to provide a flash period followed by a cooking period in which the temperature in the heating zone can be varied by changing the time of current application at each current pulsation; also to improve heat controls in other respects hereinafter specified and claimed.

Reference is to be had to the accompanying drawings forming a part of this specification, in which Fig. 1 is a front elevation of the control device, Fig. 2 is a side elevation of the control device, Fig. 3 is a sectional view through the control taken on line 3—3 of Fig. 4, Fig. 4 is a front elevation of the control device with cover removed, Fig. 5 is a sectional view through the control device taken on line 5—5 of Fig. 4, Fig. 6 is a sectional view through the device taken on line 6—6 of Fig. 4, Fig. 7 is a sectional view through the device taken on line 7—7 of Fig. 4, Fig. 8 is a wiring diagram of the control device, Figs. 9, 10 and 11 are graphical representations of the heating cycles provided by the control device, for 80%, 70% and 25% heat, respectively.

Fig. 12 is a sectional elevation of the spiral cam and motor switch control lever in the starting position with the cam follower in center position.

Fig. 13 is a view similar to Fig. 12 except that the cam follower is at 90° before the motor switch opens, Fig. 14 is similar to Fig. 12 except that the cam follower is in its final position and the motor switch is opened, and Figs. 15 and 16 are elevation and end views respectively of the bow spring assembly.

Figure 8:
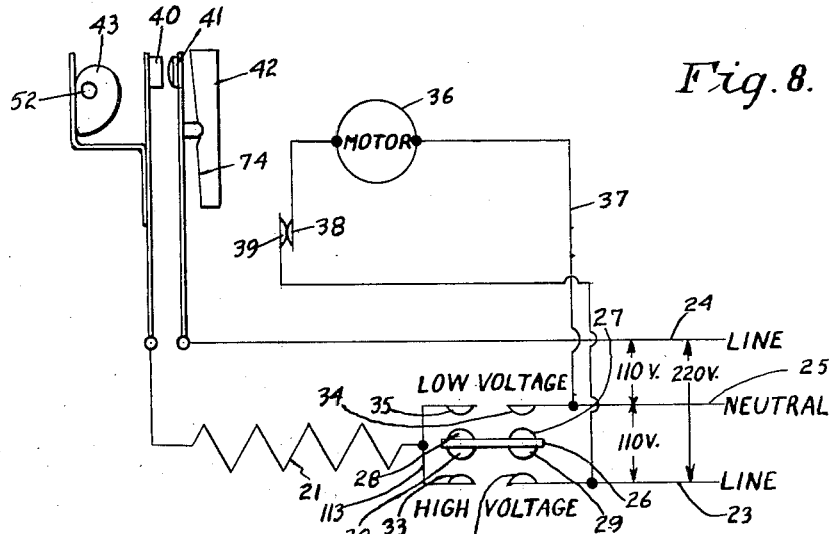

The general purpose of this device involves the use of a flash period of high voltage, such as 220 volts, in the heating element up to operating temperature. This application of high voltage is for a short time interval, of say 15–30 seconds, so as not to burn out the heating element. The device then automatically reverts to a lower voltage current of about 110 volts and passes a pulsating current through the heating element until the device is manually turned off. The period of time of each pulsation of current during the cooking period, is under the control of the operator at 3% to 100% of full heat, so as to control the temperature in the heat zone during the cooking period. In order to prevent the flash current at 220 volts from being turned on when the heating element is still quite hot, a spiral cam is used which provides a delayed time of 3½ minutes of cooling before the 220 volts current can be turned on.

Referring to Figs. 8, 9, 10 and 11 of the drawings, a preliminary flash period 20 of preliminary heating is obtained by the application of a 220 volt current to a heating element 21 in an electric oven, not shown, or upper burner, or other heating or mechanical operating device.

This flash period may extend from about 5–35 seconds or more depending on the profiles and adjustments of the cams to be hereinafter described. The current is then caused to be pulsating by the automatic controls to be described, so that spaced periods of heating 22 are produced at full heat during the cooking period. The time of each pulsation of current may be adjusted by the controls from 3% to 100% of the load, thus controlling the temperature in the oven or other heating zone. The electric circuit of the invention employs 220 volt power lines 23 and 24 and a neutral line 25. A double throw switch 26 has opposed pairs of contacts 27, 28, 29 and 30. In the lower or high voltage position, contacts 29 and 30 engage contacts 32 and 33 respectively in line 23. In the upper, or low voltage position, contacts 27 and 28 engage contacts 34 and 35 respectively in neutral line 25. A motor 36 is connected by line 37 across lines 23 and 25. Switch contacts 38 and 39 are also included in the line 37. Switch contacts 40 and 41 are included in line 24 to be operated by cam 43 to produce a pulsating current of controlled time in the heating element 21 determined by the angular position of cam 42.

The motor 36 may have an output speed of 1 R. P. M. and is attached to a spacing plate 45 by screws 46 (Fig. 2), said plate being attached to a side 47 of a plastic molded case 48 by screws 49. The molded case 48 is more fully described in the application of Tuttle Ser. No. 430,555, filed May 18, 1954. The motor 36 has an output shaft 51 which is connected to a cam shaft 52 (Fig. 5), said shaft extending through side wall 47 and a side wall 53 of said case 48. Suitable bearings 54 are provided in the side walls 47 and 53 to support the ends of shaft 52. A cover 56 closes the open face of case 48, being secured thereto by three screws 57$_a$.

A control shaft 57 extends through the cover 56 and is rotatably supported near one end by a threaded bearing 58 secured to the cover 56 by swaging. The opposite end of shaft 57 is rotatably supported by a bearing 59 which is formed in a rear wall 60 of the case 48. A compression spring 63 is mounted on shaft 57 to urge shaft 57 axially to the left (Fig. 3). A knob 64 (Fig. 2) is secured to the protruding end of shaft 57 and has an annular dial 65 on which are inscribed indicia 66 to indicate the percentage of heat during the cooking period, and also "Hi," "Lo" and "off" positions. An escutcheon plate 67 is mounted behind dial 65 on a panel plate 68, said plate 67 bearing an arrow 69 which cooperates with indicia 66 to indicate conditions in heating by the heating element 21. A stove panel plate 70 abuts cover 56, and a lock nut 71 on bearing 58, secures the case 48 to the plate 70.

The cam 42 is secured near one end of shaft 57 so that said cam 42 rotates with shaft 57 when knob 64 is turned. Cam 42 (Fig. 5) has a spiral cam surface 74 formed on one face thereof, and a follower 75 is attached to a switch arm 76, as by riveting, said follower being adapted to engage cam surface 74 to vary the position of arm 76 as cam 42 is turned by knob 64. An "off" notch 77 is formed in the cam surface 74. The contact 41 is secured to the upper end of an arm 76, and the mating contact 40 is secured to the upper end of a switch arm 77. The lower end of arm 77 is secured by a tapped rivet 78 to a boss 79 formed on the inside of case 48. The lower end of arm 76 is secured by a tapped rivet 80 to the boss 79. Grooves 82 are formed around the periphery of cam 42 to be engaged by a detent 83 formed on a detent arm 84. A transverse flange 85 on arm 84 is secured by a rivet 86 to the rear wall 60 of case 48. The detent 83 acts to yieldingly hold the cam 42 in any adjusted angular position.

Figure 9:
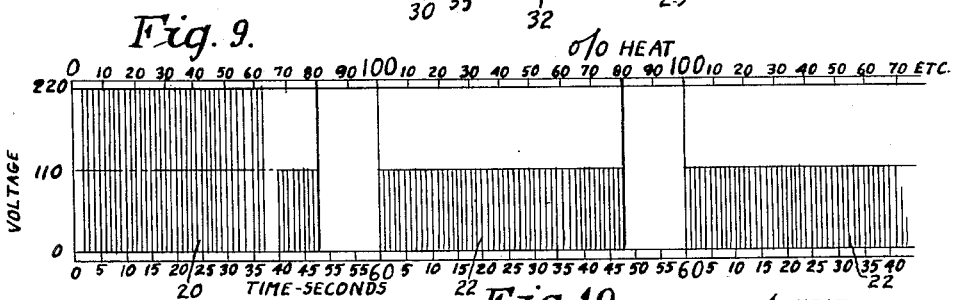
Figure 10:
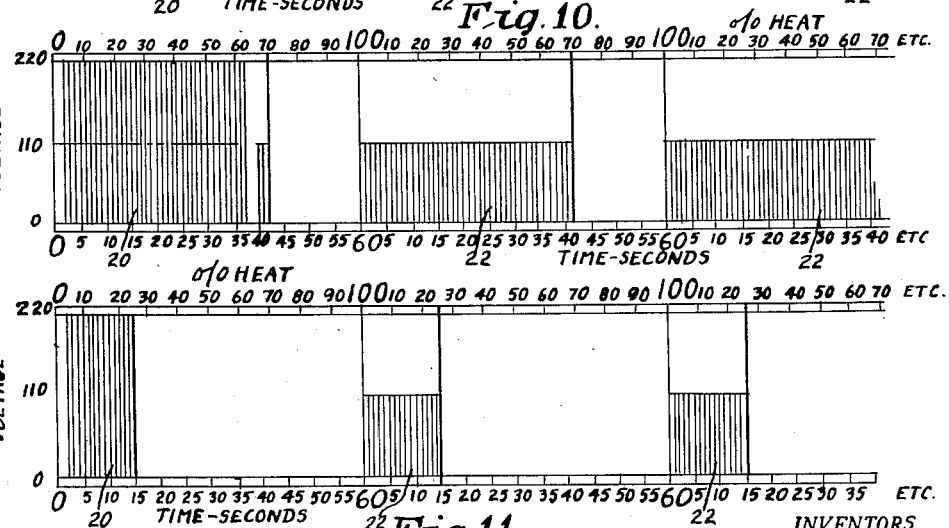
Figure 11:
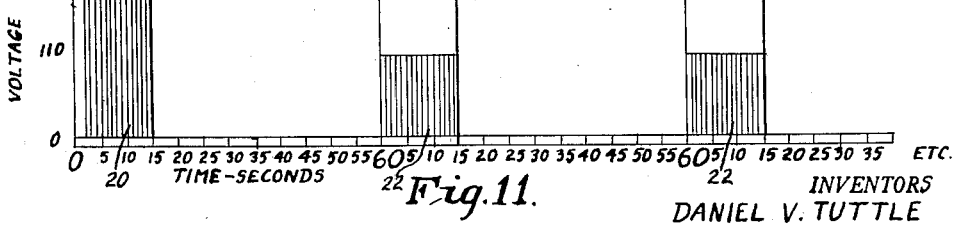

An outstanding bracket 88 is secured to the switch arm 77, and a single lobe cam 89 is secured to the shaft 52 to engage the bracket 88 and oscillate the arm 77 so as to make and break contacts 40 and 41 and thus produce a pulsating current in the heating element 21. By angular adjustment of knob 64 and cam 42, the distance between contacts 40 and 41 may be varied to regulate the actual time of contact of contacts 40 and 41. Thus, the time of current application at each pulsation may be regulated at any percentage heat, from 3% to 100%. In Fig. 9 is shown 80% heat in the heating zone, while in Figs. 10 and 11 is shown heats of 70% and 25% respectively.

In order to adjust the cam 42 slightly axially to compensate for wear on the contacts 40 and 41, we provide a set bolt 90 with a lock nut 91. The inner end of bolt 90 engages the bottom of an adjusting lever 92 which is pivotally mounted on two studs 93 which are secured to the rear wall 60 of the case 48. The upper end of lever 92 is bifurcated to partially enclose the bearing 59 to form two arms 94. The upper end of each arm 94 is provided with an arcuate contact member 95 which engages one face of cam 42 to move said cam slightly axially when the bolt 90 is rotated.

The mechanism now to be described, is for the purpose of producing in the heating element 21, a starting double voltage current for about 5 to 30 seconds, to quickly bring said element up to full heat without burning and destroying the heating element. The mechanism also provides a safety factor to prevent a new application of double voltage current to the heating element when said element is in its hottest state.

A disc-shaped cam 97 is secured to the shaft 52 and has a surface 98 of largest diameter for producing low voltage current in the heating element 21. A smallest diameter surface 99 of cam 97 produces high voltage current in the heating element 21. Two intermediate surfaces 100 and 101 in the cam 97 hold the switch 26 in neutral or off position between low and high voltage in order to reduce arcing at the change over in voltage. A follower 103 in the form of a flat plate of insulating nylon or the like, has a lower rounding nose 104 which engages the cam surfaces 98, 99, 100 and 101 as the cam 97 rotates to reciprocate the follower 103 vertically. The upper end of follower 103 is T-shaped to be received in a U-shaped contact bracket 105 having inwardly extending contact arms 29 and 30. The upper surface of bracket 105, which is preferably of silver, forms contacts 27 and 28, while contacts 29 and 30 are formed by the lower surface.

A bow-spring 107 passes through a clearance opening 108 in the follower 103 to give flexibility to said bow-spring and is secured to said follower 103 by loose fitting pin 109. One end of bow-spring 107 has a reduced width end 107$_a$ which is loosely fitted into a hole formed in the end of a bushing 110. A U-shaped conductor bracket 112 has arm 113 which forms part of the circuit leading to the heating element 21. A backwardly extending arm 114 formed on bracket 112 has a transversely extending flange 115 which is attached by a tapped rivet 116 to the rear wall 60 of case 48 for receiving a screw and conductor leading to the heating element 21. Contacts 33 and 35 are formed on the inside of arms 113 to contact with contacts 28 and 30.

The bow-spring 107 is provided at the end opposite end 107$_a$, with a pair of outstanding ears 117 which engage loosely in registering slots formed in a bracket flange 118. A second bracket flange 119 is attached by and fulcrumed on a square stud 120 having a round end 121, said stud being secured to a boss 122 formed in the rear wall 60 of the case 48, as by riveting 123. The bracket flange 118 is provided with a loop 124 which is engaged by a frusto-conical point 125 formed on an adjusting screw 126. A threaded section 127 is formed on the screw 126 to engage a bushing 128 secured in a boss 129 formed in the case wall 60. A lock nut 130 is provided on screw section 127 to hold the screw 126 in adjusted position. The action of the point 125 is to put longitudinal compression on the bow spring 107 so that said bow spring 107 normally stays in an upwardly bowed low voltage position unless it is forced to bow downwardly to high voltage position by the action of lever arm 132 formed on bell crank lever 133. Lever 133 is preferably formed of Bakelite or other insulating material. After the bow spring has been bowed downwardly by lever arm 132, and the high voltage period is passed, the bow spring 107 is then pushed to the upwardly bowed position (low voltage) by the action of cam surface 98 on follower nose 104.

The lever 133 is pivotally mounted on a stud 135 which is secured to a bracket flange 136 formed on a bracket 137. The bracket 137 has a contact 34 secured thereto for closing the low voltage circuit, and is secured by a tapped rivet 138 to a boss 139 formed in the rear wall 60 of case 48, for the screw attachment of neutral conductor 23. A bracket 141 is secured by a tapped rivet 142 to a boss 143 formed in the case rear wall 60 for screw attachment of conductor wire 23. The contact 32 is secured to a flange 145 formed on the bracket 141, for closing the high voltage circuit.

The contact 39 is also secured to one flange 146 of bracket 141 to make contact with a motor contact 38 secured to a leaf contact spring 147 which is secured by tapped rivet 149 to case wall 60 for screw attachment of the conductor wire 23. An end 151 on spring 147 is in position to be actuated by an arm 152 on lever 133 when said lever is rocked in a clockwise direction (Fig. 3). The contacts 38 and 39 are normally closed so that the motor 36 rotates until lever arm 152 opens the motor circuit.

A lever 154 has a hub 155 which is pivotally supported on a stud 156 secured to case 48. The other end of lever 154 is formed into a flat follower 157 which engages a flat 158 formed on a chord below the periphery of cam 42. Thus, when shaft 57 is rocked in one direction by knob 64, lever 154 is moved outwardly about stud 156. A follower lever 160 is pivotally mounted on lever 154 by pin 161. A follower flange 162 is formed transversely on lever 158 to bear against the spiral cam face 163 formed on a frusto-conical shaped cam 164 which is secured to the shaft 52. A tension spring 165 connects the lever 160 to a fixed bracket 165ₐ so as to urge the follower 162 against the spiral cam surface 163. The spiral cam 164 is so designed that 3½ revolutions of the shaft 52, or 3½ minutes is required for the cam 164 to move lever arm 160 counterclockwise (Fig. 3) to contact arm 152 which in turn contacts spring end 151 to open the circuit 37 and stop the rotation of the motor 36. A hub 166 is formed on cam 164 to limit the inward movement of lever 160 under the action of spring 165.

In Fig. 12 is shown the position of the various parts at the start of operations as the follower 104 is about to move from cam surface 100 to high voltage position as shown in Fig. 13. In Fig. 12, the uppermost position 165ₐ of the bow spring 107 represents the cooking period when cam nose 104 is held clear of the cam 97 by the upward bow of spring 107. As shown in Fig. 13 the follower 104 always stops with a slight clearance between the cam surface 99 and follower 104 to take the load off the motor and permit the motor to coast under low load conditions. In this view, the follower 162 is positioned about 180° before the motor switch is opened. In Fig. 14 is illustrated the final position with the motor switch contacts 38 and 39 opened and the follower 104 against resting on cam surface 100.

In operation, turning the knob 64 clockwise or counterclockwise (Fig. 1) to the desired percentage of heat, such as 70%, to be used in the cooking period, starts the following sequence of operations; Follower 157 is raised out from flat 158 on cam 42 and lever 160 snaps under the action of spring 165 to the cam hub 166 so that contacts 38 and 39 close to start the rotation of motor 36 and cam shaft 52. Follower 104 which has been resting on cam surface 100, now snaps under the action of bow spring 107, to a position near cam surface 99 (Fig. 13) and closes high voltage contacts 30 and 33 and contacts 29 and 32. 220 volts is now impressed on the heating element 21 to quickly bring said element up to high heat in about 5 to 35 seconds depending on the setting of cam 42. Follower 104 now lifts to cam surface 101 and then to low voltage cam surface 98, which raises the bow spring 107 upwardly to mid position as determined by shelf 101, remaining there for a few seconds duration before snapping to the low voltage contact. This action precludes any possibility of a flash over from line 23 to the neutral line 25. Contacts 28, 35, 27 and 34 now close and low voltage is now impressed on the heating element 21 during a cooking period. During this cooking period, cam 42 which has been turned to the 70% heat (Fig. 10), now has its surface 74 acting on follower 75 to determine the time of contact at each current pulsation, of contacts 40 and 41 under the action of cam 89 on bracket 88, said cam serving to make and break said contacts 40 and 41. During this cooking period, follower 104 is held out of contact with cam 97 by the upwardly bowing spring 107.

At the end of the desired cooking period, such as 40 minutes or the like, the operator turns the knob 64 to "off" position which allows follower 162 on lever 160 to follow spiral cam 163 for several revolutions whereupon the lever 160 acts on lever arm 152 of bell crank 133 causing it to revolve clockwise (Fig. 3). Lever arm 132 of said bell crank 133 now moves downwardly, engaging bow spring 107, forcing contacts 27 and 28 out of engagement with contacts 34 and 35 respectively and forcing follower 104 downwardly against cam surface 100 of cam 97. Continued motion of lever 160 puts additional bow in bow spring 107 thus preparing it for future operations; the same continued motion of lever 160 also acts on lever arm 152 which in turn acts on spring end 151 to open contacts 38 and 39 to stop motor 36 thus stopping all mechanical and electrical operations instantly. The lever 160 is left in position shown in Fig. 14 and follower 157 has moved into place against flat 158 on cam 42 in preparation for future operations. If the operator should change purpose intentionally or accidentally immediately after turning the knob 64 to "off" position, and decides to turn it to "Hi" or some other percentage mark while heating element 21 is still hot, a second application of high voltage is prevented in the following manner; Lever 160 snaps back to cam hub 166, and follower 162 starts up the spiral cam surface 163 and no high voltage current can pass through the heating element 21 for 3½ minutes until lever arm 152 is engaged by lever 160 to cause lever arm 132 to bow the spring 107 downwardly into high voltage position so that contacts 30, 33, 29 and 32 can close. Adjustment of the compression in bow spring 107 is made by adjusting screw 126. Adjustment for wear on contacts 40 and 41 is made by bolt 90 acting on lever plate 92.

In the claims to follow, the terms "cooking" is used to designate any kind of heating process, whether used in domestic cooking ranges, in industrial ovens, or other heating or mechanical devices. The term "heating element" is broadly used to designate any relay, solenoid, synchronized conveyor control circuit, or other industrial device whose motion is to be controlled. This application discloses and claims certain improvements on the devices of patents to Brown and Carson Nos. 2,194,586 and 2,194,587 of March 26, 1940.

We would state in conclusion that, while the example illustrated constitutes a practical embodiment of our invention, we do not wish to limit ourselves precisely to these details, since manifestly the same may be considerably varied without departing from the spirit of the invention as defined in the appended claims.

Having thus described our invention, we claim as new and desire to secure by Letters Patent:

1. In an automatic control device for a heating element, an electric circuit including said heating element, a motor in said circuit, a double throw switch in said circuit for supplying either high or low voltage current to said heating element, a flat bow spring element for actuating said double throw switch, cam means actuated by said motor for automatically actuating said bow spring element to produce a flash period of high voltage and a long period of low voltage in said heating element, and a second cam actuated by said motor to cause said current to be pulsating.

2. A device as described in claim 1 characterized by a third cam actuated by said motor for controlling the operation of said double throw switch, manual control means for causing the flow of current through said heating element, said third cam being arranged to prevent a further flow of high voltage current through said heating element by said control means, before said heating element has cooled from it's hottest, high voltage condition.

3. In an automatic control device for a heating element, an electric circuit including said heating element, a motor in said circuit, a double throw switch in said circuit for supplying high and low voltage current to said heating element, a flat bow spring element for actuating said double throw switch to high and low voltage and neutral positions, a spiral cam actuated by said motor, control means, and means for operation by said spiral cam to prevent the manual switching of high voltage current to said heating element while said heating element is in hottest condition.

4. The combination with a heating element, of an electric circuit, a motor in said circuit with said heating element, a line power source of high and low voltage current for said circuit, manual control means, a cam shaft actuated by said motor, a cam on said shaft having associated switch means for delivering a pulsating current to said heating element, a second spiral cam on said shaft having associated switch means for automatically operating on said manual control means to prevent the flow of high voltage current through said heating element when said heating element is in hottest condition, and a third cam means on said shaft having associated switch means to provide a high and low voltage current through said heating element.

5. The combination with a heating element, of an electric circuit, a motor in said circuit with said heating element, a line power source of high and low voltage current for said circuit, manual control means, a cam shaft actuated by said motor, a spiral cam on said shaft having associated switch means for automatically operating on said manual control means to prevent the flow of high voltage current through said heating element when said heating element is in hottest condition, a pivotally mounted lever, a follower on said lever arranged to engage said spiral cam, and diagonal spring means to hold said follower yieldingly against said spiral cam.

6. In an automatic control device for a heating element, an electric circuit including said heating element, a line power source of high and low voltage current for said circuit, a motor in said circuit, a cam shaft actuated by said motor, a cam on said cam shaft, switch means associated with said cam for delivering a pulsating current to said heating element, a control shaft, a control cam mounted on said control shaft for varying said switch means, said control cam having a flat in the periphery thereof, a second spiral cam on said cam shaft, a follower lever for engaging said spiral cam, and pivotally mounted lever having a follower to engage said flat, said follower lever being pivotally mounted on said pivotally mounted lever, said control cam being arranged to move said follower from said flat and disengage said follower lever from said spiral cam.

7. In an automatic control device for a heating element, an electric circuit including said heating element and having a motor therein, a double throw switch in said circuit for supplying high and low voltage current to said heating element, a flat bow spring element for actuating said double throw switch, and means for automatically actuating said bow spring element to produce a flash period at high voltage in said heating element and a long period of low voltage in said heating element, the said means including cam means associated with said motor to actuate said bow spring element.

8. A heating element control through which current is suppliable to a heating element from a three wire feed having two wires between which a high voltage current is suppliable and a third wire between which and each of said two wires a low voltage current is suppliable, said control having switching means through which the opposite ends of the heating element are connectible to the three wire feed for supply of current thereto, the said switching means being adjustable to two positions for supply of high voltage current and low voltage current respectively to the heating element, and the said control having timing mechanism by which said switching means is adjustable to the high voltage current supply position for a constant length of time before each occasion of adjustment thereof to the low voltage current supply position, the high and low voltage current supply being regulated by a switch which is repetitively opened and closed by a motor and provided with manually adjustable means by which the ratio of closing time of the repetitive operations of said switch to the open time thereof is selectively variable.

9. A heating element control through which high voltage current and low voltage current is selectively suppliable to the heating element, and wherein the high voltage current is suppliable to the heating element for a selected period of time before each occasion of selective supply of the low voltage current thereto, and a timing mechanism which is operable to preclude supply of high voltage current to the heating element for a selected length of time after each occasion of selective current supply to the heating element, the said control having a motor and separate cam means operated by the motor and controlling respectively the duration of the time that the high voltage current is supplied to the heating element and the duration of the time that the supply of high voltage current is precluded.

10. A heating element control through which high voltage current and low voltage current is selectively suppliable to the heating element, and wherein the high voltage current is suppliable to the heating element for a selected period of time before each occasion of selective supply of the low voltage current thereto, and a timing mechanism which is operable to preclude supply of high voltage current to the heating element for a selected length of time after each occasion of selective current supply to the heating element, the said control having motor operated timing mechanism controlling the duration of the time that the high voltage current is supplied to the heating element and the duration of the time that the supply of high voltage current is precluded and wherein the motor continues to operate for a prescribed length of time after termination of either selected supply of current to the heating element.

References Cited in the file of this patent

UNITED STATES PATENTS

| | | |
|---|---|---|
| 1,522,988 | Warren | Jan. 13, 1925 |
| 2,139,454 | McCabe | Dec. 6, 1938 |
| 2,363,326 | Hodgkins | Nov. 21, 1944 |
| 2,410,014 | Clark | Oct. 29, 1946 |
| 2,503,082 | Tuttle | Apr. 4, 1950 |
| 2,721,926 | Baird | Oct. 25, 1955 |